March 4, 1952  J. R. KIRKPATRICK  2,588,012
SPRING SUSPENSION

Filed Oct. 10, 1947  4 Sheets-Sheet 1

INVENTOR.
JOSEPH R. KIRKPATRICK
BY
West & Oldham
ATTORNEYS

March 4, 1952

J. R. KIRKPATRICK 2,588,012

SPRING SUSPENSION

Filed Oct. 10, 1947

4 Sheets-Sheet 2

INVENTOR.
JOSEPH R. KIRKPATRICK
BY
West + Oldham
ATTORNEYS

March 4, 1952 J. R. KIRKPATRICK 2,588,012
SPRING SUSPENSION
Filed Oct. 10, 1947 4 Sheets-Sheet 3
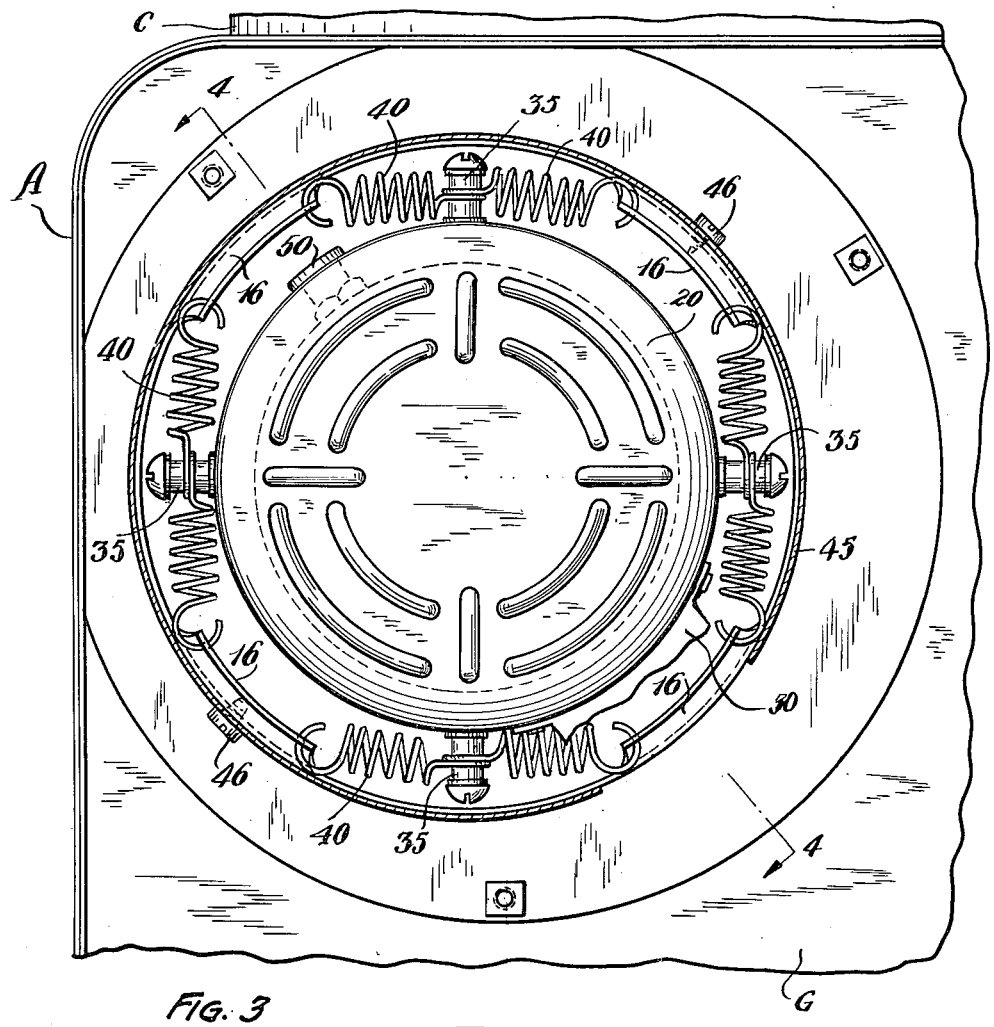
FIG. 3
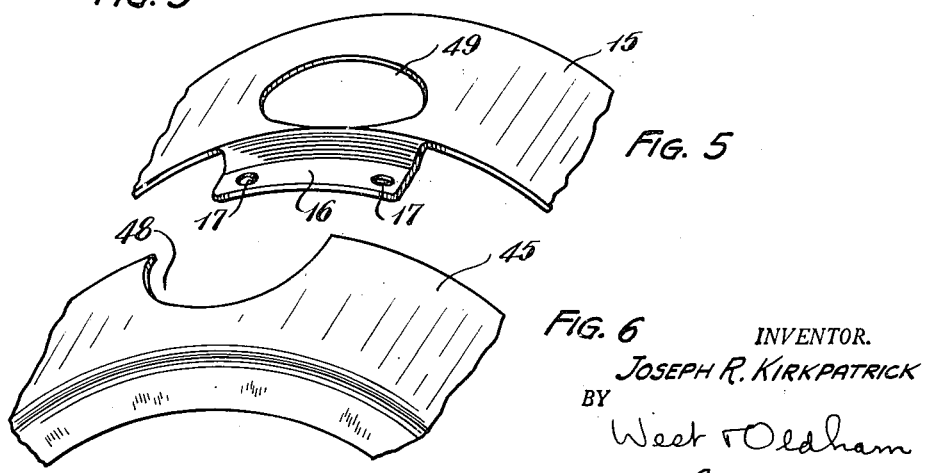
FIG. 5
FIG. 6
INVENTOR.
JOSEPH R. KIRKPATRICK
BY
West & Oldham
ATTORNEYS Patented Mar. 4, 1952

2,588,012

UNITED STATES PATENT OFFICE 2,588,012

SPRING SUSPENSION

Joseph Robert Kirkpatrick, Euclid, Ohio, assignor to Perfection Stove Company, Cleveland, Ohio, a corporation of Ohio Application October 10, 1947, Serial No. 779,020

1 Claim. (Cl. 248—18)

This invention provides a resilient mounting for units comprising electric motors, or, more particularly, a spring suspension for an electric motor and fan unit, with the fundamental object in view of preventing any appreciable transmission of vibrations originating in the suspended unit to the basic structure from which it is supported.

The invention originated in and is peculiarly suited to the mounting of the motor and fan unit of the mechanical draft inducer disclosed and claimed in the joint application of Marc Resek, David L. Raymond, and the present applicant, filed September 3, 1947, Serial No. 771,828. In said draft inducer, the motor and fan unit is mounted on a wall of a sheet metal casing which, in the manner of a sounding board, produces and amplifies noises resulting from vibrations communicated to it from the unit. It is obvious that like conditions may be encountered in other apparatus incorporating similar units, wherefore the invention is not limited to this particular association.

It is a further object of the invention to provide a simple and inexpensive, strong and durable construction, and one that comprises few parts that may be readily produced, desirably from sheet metal, and quickly and conveniently assembled.

Another object is to provide a resilient mounting or spring suspension for an electric motor and fan unit in which a flow of cool air is induced and permitted directly about the motor so as to prevent overheating of the latter.

A further object of the invention is to provide a motor mounting that is very convenient of installation and wherein the motor and fan unit is resiliently suspended in a well balanced state.

These and other objects that will appear as the description proceeds are attained in the embodiment of the invention illustrated in the accompanying drawings, and while I shall proceed to describe the same in detail, I wish it to be understood that the invention is not limited to the details shown, but is susceptible to changes and modifications within the scope of the claim appended hereto.

Figure 1:
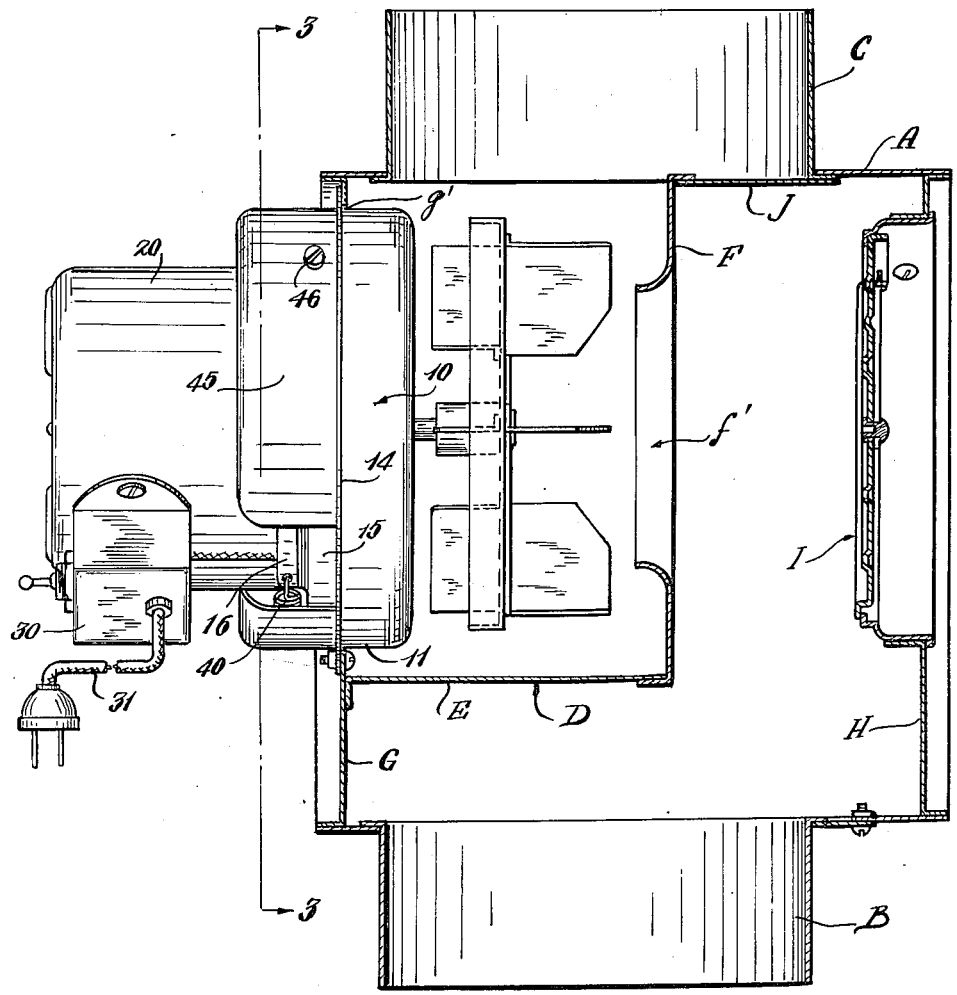
Figure 2:
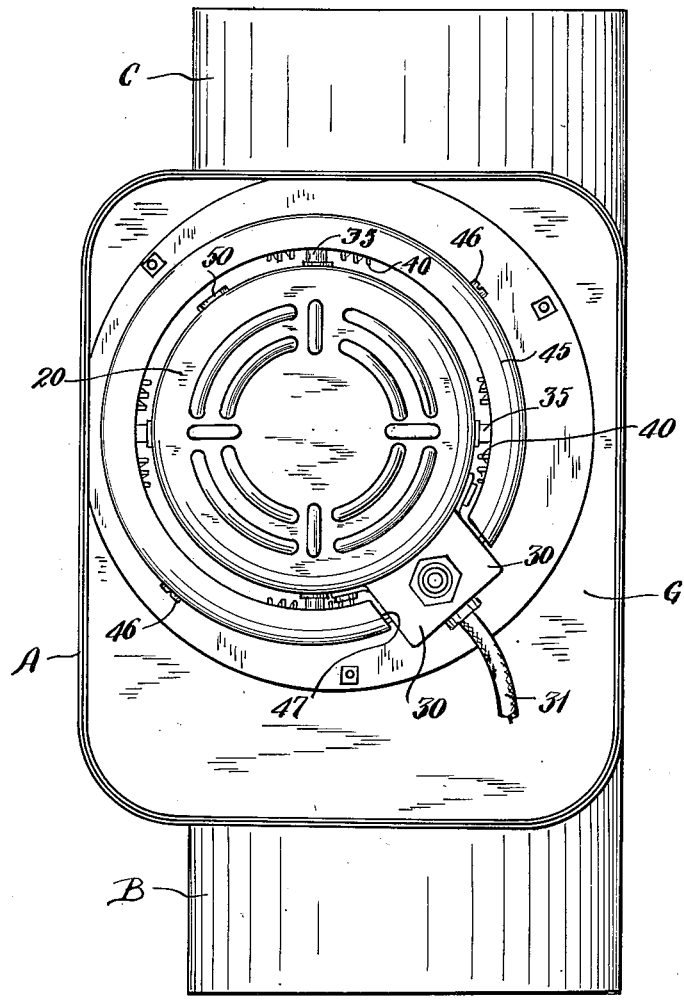
Figure 4:
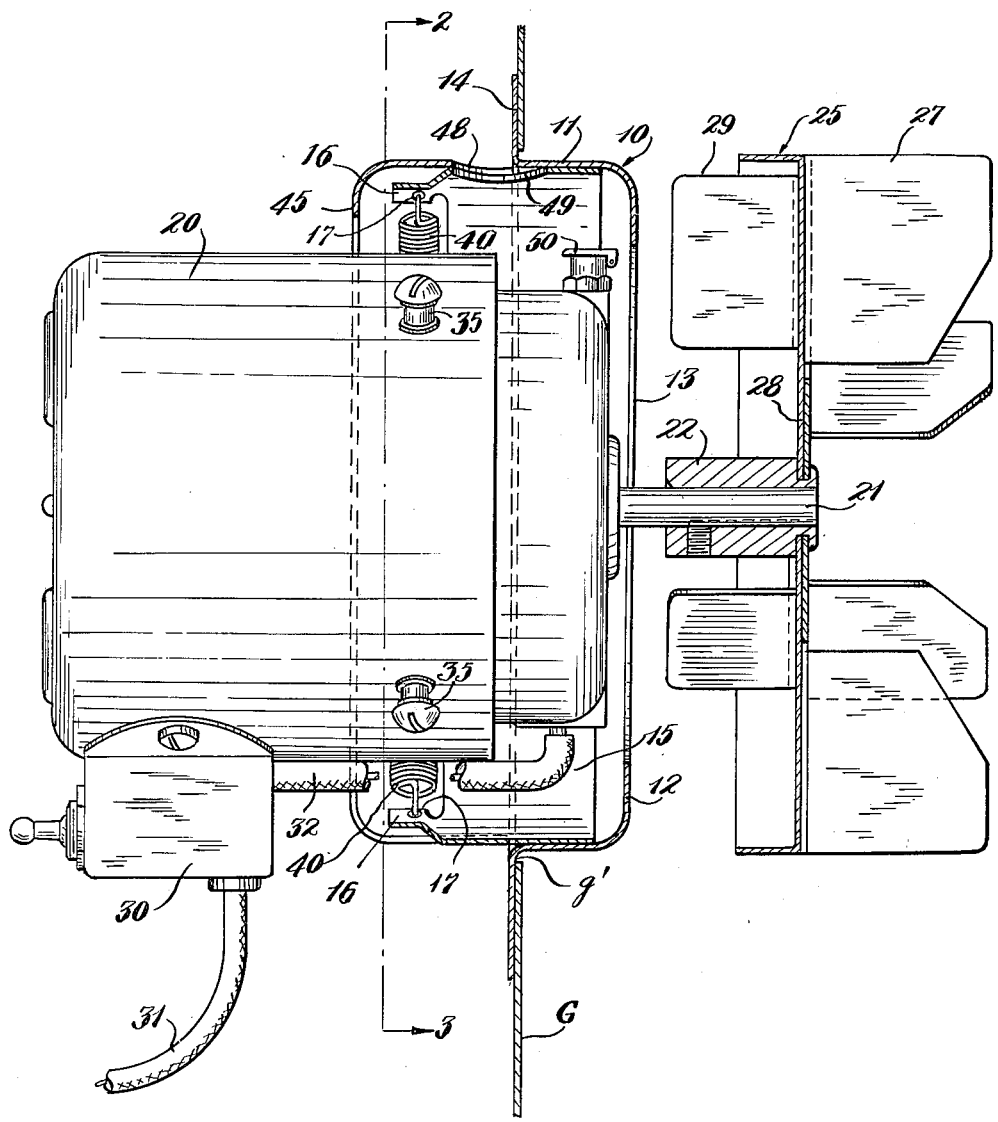

In the drawings, Fig. 1 is a vertical section through a draft inducer of the kind disclosed in the aforesaid application, incorporating the resilient mounting for the motor and fan unit that constitutes the present invention, such mounting, along with the motor and fan, being shown in elevation; Fig. 2 is an elevational view taken as though looking from the left of Fig. 1; Fig. 3 is a section on the line 3—3 of Fig. 1, with the motor shown in elevation, and on a scale considerably enlarged over that of the preceding views; Fig. 4 is a section on the line 4—4 of Fig. 3, again, with the motor in elevation; and Figs. 5 and 6 are fragmentary perspective views of the motor mounting ring and the spring cover, respectively.

The draft inducer, in connection with which I have illustrated my present invention, consists of a substantially rectangular sheet metal casing A, provided on its underside with an inlet stub or collar B, and at its top with an outlet stub or collar C. A fan housing, designated generally by the reference letter D, is located within the casing A and is made up, in part, of a peripheral wall E and an end wall F, the latter having a relatively large inlet opening $f'$ surrounded by an inwardly curved flange. The other end wall of the fan housing D is formed by part of the end wall G of the casing A, said end wall G having a large circular opening $g'$ that is in axial alignment with the inlet opening $f'$ of the fan housing. The opposite end wall of the casing A is designated H and within a flanged opening thereof is fitted a conventional automatic draft regulator I.

The fan housing D discharges through the outlet stub C, and direct communication is prevented between said outlet stub and the portion of the casing A into which the inlet stub B discharges by a plate J.

10 denotes an annular mounting member that is formed, desirably from sheet metal, to provide a cylindrical portion 11 that is joined, through a curved portion of liberal radius at what may be considered its forward end, to an inwardly directed flange 12 that surrounds a relatively large opening 13. An attaching flange 14 extends outwardly in a plane perpendicular to the axis of the member 10 at the rear end of the cylindrical portion 11. Fitting within the cylindrical portion 11 is the forward end of a motor mounting ring 15, also desirably constructed of sheet metal. This ring may be permanently secured to the mounting member by welding or other means. The motor mounting ring projects a substantial distance rearwardly of the plane of the flange 14, and extending from its rear edge are four lugs 16 that are spaced equal distances apart circumferentially of the ring. The lugs 16 are deflected inwardly and then extend in an axial direction, and are shown as curved in concentric relation to the ring. At their ends the lugs are provided with apertures 17.

20 is an electric motor, to the shaft 21 of which is secured the hub 22 of a fan designated generally by the reference numeral 25. In the present instance this fan is shown as double, with six blades 27 of suitable size secured to and projecting forwardly from a disk 28 that is fastened to the hub 22, while a lesser number of smaller blades 29 are fastened to and extend rearwardly from said disk.

A switch box 30 is secured to the motor 20 adjacent the rear end of the latter and houses a conventional electric switch that controls current supplied through conductors 31 and 32 to the motor. Spaced equal distances apart about the motor, and projecting therefrom in a radial direction, are four spring anchorage elements or studs 35, the same lying in a plane substantially coincident with the center of gravity of the unit comprising the motor 20 and fan 25.

40 denotes coiled springs, formed with hooks at their ends and arranged in pairs. The adjacent hooked ends of the springs of each pair encircle one of the studs 35 on the motor, while their opposite hooked ends are engaged through holes 17 in the adjacent ends of opposed lugs 16. Thus, the unit comprising the motor 20 and fan 25 is resiliently suspended in a well balanced condition from the mounting member 10 through the ring 15 and springs 40.

The springs 40 are protected and partially concealed by an annular spring cover 45, desirably formed from sheet metal, which has its forward cylindrical end engaged over the rear end of the motor mounting ring 15 and detachably fastened thereto by screws 46. The rear, inwardly directed edge of the spring cover 45 is spaced a substantial distance from the motor, as best appears from Figs. 2 and 4, in order to provide ample space between the two for ventilating purposes, and said spring casing 45 is cut away for a limited part of its circumference to provide a space 47 for the accommodation of the switch box 30 when the spring casing is passed over the motor 20. Diametrically opposite the space 47, the peripheral wall of the casing 45 is provided with a notch 48 (Fig. 6) that registers with an opening 49 (Fig. 5) in the spring mounting ring 15, and through which notch and opening access may be had to the lubricant fitting 50 of the motor.

In the installation of the invention, the cylindrical portion 11 of the mounting member 10 is projected through the large circular opening g' in the casing wall G so that the flange 14 bears flat against the outer side of said wall and with apertures therein registering with apertures in the wall G for reception of the fastening means or bolts 51 by which the mounting member is secured to the casing.

It is evident from the foregoing that, by reason of the tension of the springs 40, the unit including the motor 20 and fan 25 is resiliently held with the motor shaft 21 substantially perpendicular to the plane of the springs, and that the springs absorb vibration originating in the motor and fan unit.

When the fan is in operation, the blades 29 create a draft inwardly through the space between the motor mounting parts and the end of the motor adjacent the fan, thereby to maintain the motor relatively cool, which is especially advantageous when the invention is associated with a draft inducer for combustion apparatus, as herein illustrated.

Having thus described my invention, what I claim is:

In combination, an annular mounting member formed from sheet metal to provide a cylindrical portion that is flanged inwardly at one end a relatively short distance, and is flared outwardly at the other end to provide an attaching flange, a cylindrical motor mounting ring of sheet metal having one of its ends telescoped into the cylindrical portion of the mounting member and secured thereto, the opposite end of said ring projecting a substantial distance beyond the plane of said attaching flange, lugs extending inwardly and thence in an axial direction from the edge of the ring remote from the mounting member, said lugs being spaced apart substantially equal distances about the ring, a full floating suspended unit including an electric motor arranged with its forward end within and in radially spaced relation to the aforesaid mounting member and ring, spring anchorage means carried by and spaced circumferentially about the motor in the radial plane of the aforesaid lugs and in the same plane as the center of gravity of said unit, each of said spring anchorage means being substantially midway between adjacent ones of said lugs, helical tension springs arranged in pairs with the adjacent ends of the springs of each pair secured to the same one of the spring anchorage means and their opposite ends connected to the adjacent lugs, and an annular spring cover having a cylindrical end fitting over and detachably connected to the end of the spring mounting ring that is provided with said lugs, the end of said spring casing remote from said ring being turned inwardly and disposed in radially spaced relation to the motor.

JOSEPH ROBERT KIRKPATRICK.

REFERENCES CITED

The following references are of record in the file of this patent:

UNITED STATES PATENTS

| Number | Name | Date |
| --- | --- | --- |
| 831,284 | Ilg | Sept. 18, 1906 |
| 1,786,203 | Gilbert | Dec. 23, 1930 |
| 1,938,799 | Bourne | Dec. 12, 1933 |
| 2,349,215 | Wahlborg | May 16, 1944 |